(12) United States Patent
Guan

(10) Patent No.: US 12,277,351 B1
(45) Date of Patent: Apr. 15, 2025

(54) POLARITY INVERSION METHOD AND APPARATUS, STORAGE MEDIUM AND ELECTRONIC APPARATUS

(71) Applicant: SUZHOU METABRAIN INTELLIGENT TECHNOLOGY CO., LTD., Jiangsu (CN)

(72) Inventor: Yanguang Guan, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/853,016

(22) PCT Filed: Mar. 30, 2023

(86) PCT No.: PCT/CN2023/085260
§ 371 (c)(1),
(2) Date: Sep. 30, 2024

(87) PCT Pub. No.: WO2024/113571
PCT Pub. Date: Jun. 6, 2024

(30) Foreign Application Priority Data

Nov. 30, 2022 (CN) .......................... 202211519720.X

(51) Int. Cl.
*G06F 3/06* (2006.01)
*G06F 13/40* (2006.01)
*G06F 13/42* (2006.01)

(52) U.S. Cl.
CPC .......... *G06F 3/0676* (2013.01); *G06F 3/0604* (2013.01); *G06F 13/4068* (2013.01); *G06F 13/4295* (2013.01)

(58) Field of Classification Search
CPC .. G06F 3/0676; G06F 3/0604; G06F 13/4068; G06F 13/4295
See application file for complete search history.

(56) References Cited

U.S. PATENT DOCUMENTS

| | | | |
|---|---|---|---|
| 8,036,314 B2 * | 10/2011 | Faulhaber | H04L 25/0296 375/316 |
| 11,430,509 B2 * | 8/2022 | Tortorelli | G11C 29/50004 |

(Continued)

FOREIGN PATENT DOCUMENTS

| | | | | |
|---|---|---|---|---|
| CN | 101383152 A | | 3/2009 | |
| CN | 111147401 A | * | 5/2020 | ........... G06F 13/102 |

(Continued)

OTHER PUBLICATIONS

International Search Report and Written Opinion for International Application No. PCT/CN2023/085260 mailed Jun. 23, 2023, with English translation of Search Report.

(Continued)

*Primary Examiner* — Ryan Bertram
(74) *Attorney, Agent, or Firm* — Merchant & Gould P.C.

(57) ABSTRACT

Disclosed are a polarity inversion method and apparatus, a storage medium, and an electronic apparatus. The method includes: acquiring a product ID of a current hard disk, an identity ID of a slot of a SAS card connected to the current hard disk, and type information of the SAS card, wherein the identity ID includes a bus ID, a device ID, and a function ID; determining corresponding polarity inversion information from a preset table according to the product ID, the identity ID, and the type information, wherein different columns of the preset table are respectively configured to indicate different product IDs of the hard disk, different identity IDs of the slot, and different ID information of the SAS card; and inverting the polarity of the SAS card according to the polarity inversion information, so that the polarity which is inverted is consistent with the polarity of the current hard disk.

20 Claims, 4 Drawing Sheets

(56) References Cited

U.S. PATENT DOCUMENTS

| | | | | |
|---|---|---|---|---|
| 2009/0059417 A1* | 3/2009 | Takeo | ................... | G11B 5/1278 360/75 |
| 2009/0296859 A1* | 12/2009 | Faulhaber | ........... | H04L 25/0296 375/340 |
| 2018/0357188 A1* | 12/2018 | Brief | ................... | G06F 13/1668 |
| 2021/0264972 A1* | 8/2021 | Tortorelli | ............... | G11C 16/26 |

FOREIGN PATENT DOCUMENTS

| | | | |
|---|---|---|---|
| CN | 111984568 A | 11/2020 | |
| CN | 113760667 A | 12/2021 | |
| CN | 114968105 A | 8/2022 | |
| CN | 115061958 A | 9/2022 | |
| CN | 115309334 A | 11/2022 | |
| CN | 115599311 A | 1/2023 | |
| EP | 1388976 A1 * | 2/2004 | ....... H04L 12/40032 |
| WO | 2024113571 A1 | 6/2024 | |

OTHER PUBLICATIONS

Chinese Search Report received for CN Application No. 202211519720.X on Jan. 12, 2023, 2 pgs.

* cited by examiner

POLARITY INVERSION METHOD AND APPARATUS, STORAGE MEDIUM AND ELECTRONIC APPARATUS

CROSS-REFERENCE TO RELATED APPLICATION

The present application is a National Stage Application of PCT International Application No.: PCT/CN2023/085260 filed on Mar. 30, 2023, which claims priority to Chinese Patent Application 202211519720.X, filed in the China National Intellectual Property Administration on Nov. 30, 2022, the disclosure of which is incorporated herein by reference in its entirety.

TECHNICAL FIELD

Embodiments of the present disclosure relate to the field of Internet, and in particular, to a polarity inversion method and apparatus, a storage medium, and an electronic apparatus.

BACKGROUND

In the field of cloud computing data centers, with the development of Internet technology, network data has increased dramatically, and the requirements for network storage are getting higher and higher. A Serial Attached SCSI (SAS) controller based on an SAS protocol cooperates with an expander to achieve the expansion and management of a hard disk. An SAS has the highest interface rate in the current disk channel technology. By adopting a channel merging technology, the SAS supports merging a plurality of phys into one port, which may provide a channel bandwidth of up to tens of gigabytes, such as the commonly used 4*SAS wide port having a bandwidth of up to 12 Gbit/s. The switching architecture of the SAS supports the expansion of a plurality of devices, and an SAS domain is theoretically connected to up to 16,128 devices. At the same time, an SAS device supports 24×7 multi-threaded design to meet multi-task applications. The SAS device based on the most mature SCSI technology in the current storage field is compatible with Serial Advanced Technology Attachment (SATA), so that an SAS channel technology has a wide range of applications and good compatibility.

There are many SAS cards for hard disk expansion. Different manufacturers and models have different phy numbers and phy polarities. Some storage machines have onboard SAS expansion slots, where TX and RX polarities of a phy port may also be different, so that it is necessary to confirm whether the polarity of the physical phy is consistent each time product development is performed, and if not, a driver needs to be adapted, and the consistency of the phy polarity is achieved by modifying the logical phy polarity. Although this method solves the problem, a large amount of human resources are consumed, and a large amount of driver versions need to be maintained, thereby increasing the development and maintenance costs.

No effective solution has yet been proposed for the problems such as being unable to communicate with the hard disk when the phy polarity of the SAS card is inconsistent with the phy polarity of the hard disk in the related art.

SUMMARY

Embodiments of the present disclosure provide a polarity inversion method and apparatus, a storage medium, and an electronic apparatus.

According to a first aspect of the present disclosure, a polarity inversion method is provided, which includes: acquiring a product ID of a current hard disk, an identity ID of a slot of an SAS card connected to the current hard disk, and type information of the SAS card, where the identity ID includes a bus ID, a device ID, and a function ID; determining corresponding polarity inversion information from a preset table according to the product ID, the identity ID, and the type information, where different columns of the preset table are respectively configured to indicate different product IDs of the hard disk, different identity IDs of the slot, and different ID information of the SAS card; and inverting polarity of the SAS card according to the polarity inversion information, so that the polarity which is inverted is consistent with polarity of the current hard disk.

In some embodiments, acquiring the product ID of the current hard disk includes: sending an Intelligent Platform Management Interface (IPMI) command to a target backplane, where the target backplane is provided with the hard disk; and receiving response information of the target backplane, and parsing the product ID from the response information.

In some embodiments, sending the IPMI command to the target backplane includes: in a case where the target backplane is a dual Programmable Read Only Memory (PROM) backplane, sending the IPMI command to a first PROM in two PROMs. In a case where the first PROM fails to successfully acquire the product ID, the IPMI command is forwarded to a second PROM, and the two PROMs include the first PROM and the second PROM.

In some embodiments, the method further includes: in a case where neither the first PROM nor the second PROM acquires the product ID, using a default product ID as the product ID of the current hard disk.

In some embodiments, before sending the IPMI command to the target backplane, the method further includes: acquiring all IPMI commands provided by a Baseband Management Controller (BMC) of the target backplane; and determining the IPMI command to be sent to the target backplane from all the IPMI commands.

In some embodiments, acquiring the identity ID of the slot of the SAS card connected to the current hard disk includes: polling all SAS cards connected to the current hard disk to acquire the device IDs of all the SAS cards; and in a case where a target device ID in the device IDs of all the SAS cards hits the preset table, acquiring a target bus ID and a target function ID corresponding to the target device ID. The identity ID of the slot includes the target device ID, the target bus ID, and the target function ID.

In some embodiments, acquiring the type information of the SAS card connected to the current hard disk includes: acquiring the product ID of the current hard disk; and acquiring the type information of the SAS card corresponding to the product ID of the current hard disk according to a correspondence between the product ID and the type information of the SAS card.

In some embodiments, acquiring the corresponding polarity inversion information from the preset table according to the product ID, the identity ID, and the type information includes: searching a target row that matches the product ID, the identity ID, and the type information from the preset table; and determining the polarity inversion information corresponding to the product ID, the identity ID, and the type information from the content corresponding to the target row. The polarity inversion information includes an SAS card that needs to perform polarity inversion, and an inversion manner that performs inversion.

In some embodiments, in the process of determining whether the polarity of the SAS card needs to be inverted according to the polarity inversion information, so that the SAS card with the polarity which is inverted communicates with the current hard disk, a target value is assigned to a field page_code of a target chip, and an inversion command is generated according to the field page_code after the target value is assigned; and the polarity of the SAS card that needs to perform polarity inversion is inverted according to the inversion command.

In some embodiments, after inverting the polarity of the SAS card according to the polarity inversion information, so that the polarity which is inverted is consistent with the polarity of the current hard disk, the method further includes: initiating a link invalidation process through an uplink port of the SAS card with the polarity which is inverted; and initiating, after a preset time period, a link enabling process through the uplink port of the SAS card with the polarity which is inverted, so as to trigger the recovery capability of a link.

In some embodiments, after initiating, after the preset time period, the link enabling process through the uplink port of the SAS card with the polarity which is inverted, so as to trigger the recovery capability of the link, the method further includes: reading a link status of the link; parsing a link speed and a link bandwidth of the link from the link status; determining whether the link speed meets a first preset range and whether the link bandwidth meets a second preset range; and in a case where the link speed does not meet the first preset range and the link bandwidth does not meet the second preset range, determining that the link of the SAS card with the polarity which is inverted has an abnormal configuration.

In some embodiments, after determining that the link of the SAS card with the polarity which is inverted has the abnormal configuration, the above method further includes: setting the polarity corresponding to the link having the abnormal configuration as the non-polarity which is inverted; and in a case where the link recovery capability of the link is triggered again and the link is determined to have the abnormal configuration again, stopping inverting the polarity corresponding to the link having the abnormal configuration.

According to a second aspect of the present disclosure, a polarity inversion apparatus is further provided, which includes: an acquisition component, configured to acquire a product ID of a current hard disk, an identity ID of a slot corresponding to the current hard disk, and type information of an SAS card connected to the current hard disk, where the identity ID includes a bus ID, a device ID, and a function ID; a first determination component, configured to acquire corresponding polarity inversion information from a preset table according to the product ID, the identity ID, and the type information, where different columns of the preset table are respectively configured to indicate different product IDs of the hard disk, different identity IDs of the slot corresponding to the hard disk, and different ID information of the SAS card; and a second determination component, configured to determine whether polarity of the SAS card needs to be inverted according to the polarity inversion information, so that the polarity which is inverted is consistent with polarity of the current hard disk.

According to a third aspect of the present disclosure, a computer-readable storage medium is further provided, in which a computer program is stored. The computer program is executed by a processor to perform the above polarity inversion method.

According to a fourth aspect of the present disclosure, an electronic apparatus is further provided, which includes: a memory, a processor, and a computer program stored in the memory and runnable on the processor. The processor is configured to run the computer program to perform the above polarity inversion method.

DETAILED DESCRIPTION OF THE EMBODIMENTS

Embodiments of the present disclosure are described below with reference to the drawings and in conjunction with the embodiments in detail.

It is to be noted that the terms "first", "second" and the like in the description, claims and the above-mentioned drawings of the present disclosure are used for distinguishing similar objects rather than describing a specific sequence or a precedence order.

Figure 1:
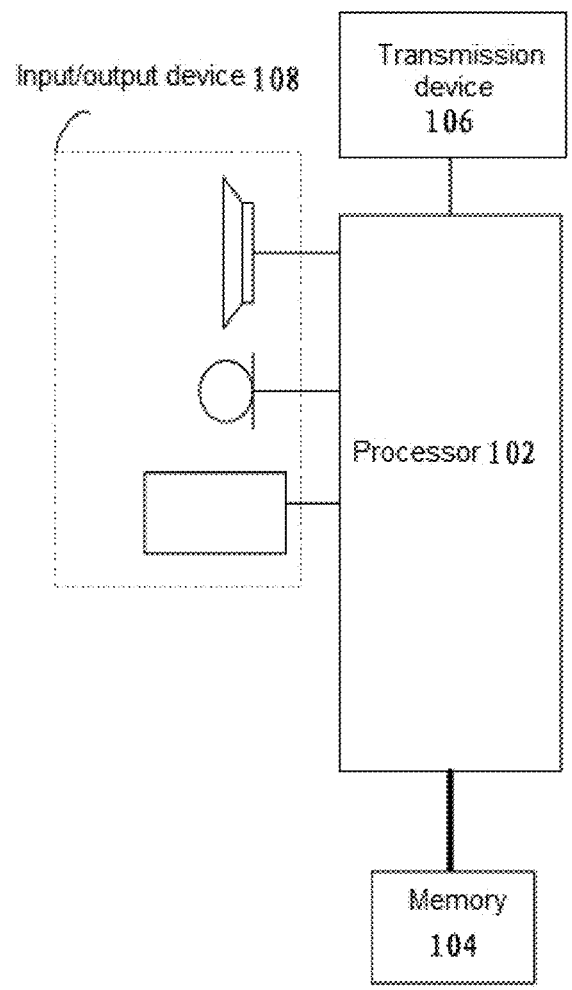
FIG. 1 is a structural block diagram of hardware of a computer terminal of an optional polarity inversion method according to an embodiment of the present disclosure.

The method embodiment provided by the embodiments of the present disclosure may be implemented in a mobile terminal, a computer terminal or a similar computing apparatus. Taking running on the mobile terminal as an example, FIG. 1 is a structural block diagram of hardware of a mobile terminal of a polarity inversion method according to an embodiment of the present disclosure. As shown in FIG. 1, the mobile terminal may include one or more (only one is shown in FIG. 1) processors 102 (the processor 102 may include, but is not limited to, a processing apparatus such as a Micro Controller Unit (MCU) or a Field Programmable Gate Array (FPGA) and a memory 104 for storing data. The above mobile terminal may further include a transmission device 106 with a communication function and an input/output device 108 for communication functions. Those of ordinary skill in the art may understand that the structure shown in FIG. 1 is only schematic and not intended to limit the structure of the above mobile terminal. For example, the mobile terminal may further include more or fewer components than shown in FIG. 1, or has a different configuration from that shown in FIG. 1.

The memory 104 may be configured to store a computer program, for example, a software program and a component of application software, for example, a computer program corresponding to the polarity inversion method in the embodiments of the present disclosure. The processor 102 runs the computer program stored in the memory 104, thereby executing various functional applications and data processing, namely implementing the above method. The memory 104 may include a high speed Random Access Memory (RAM) and may further include a non-transitory memory such as one or more magnetic storage apparatuses, a flash memory, or other non-transitory solid state memories. In some examples, the memory 104 may further include memories remotely located relative to the processor 102, which may be connected to the mobile terminal over a network. The examples of such networks include, but are not limited to, the Internet, the Intranet, local area networks, mobile communication networks, and combinations thereof.

The transmission component 106 is configured to receive or send data via a network. A specific example of the network may include a wireless network provided by a communication provider of the mobile terminal. In one example, the transmission device 106 includes a Network Interface Controller (NIC) that may be connected to other network devices through a base station to communicate with the Internet. In one example, the transmission device 106 may be a Radio Frequency (RF) component, for communicating with the Internet wirelessly.

In order to better understand the technical solutions of the following embodiments, the terms appearing in the embodiments are explained below.

An external plug-in card refers to a pluggable Peripheral Component Interconnect Express (PCIE) device that supports a PCIE bus interface in a server or storage.

An SAS, i.e., a serial SCSI technology, is disk connection technology that combines the advantages of parallel SCSI and serial connection technologies (such as Fiber Channel (FC), Serial Storage Architecture (SSA), IEEE1394, etc.), uses a serial communication protocol as a protocol infrastructure, adopts an SCSI-3 extended command set, and is compatible with a SATA device, and is a multi-level storage device connection protocol stack.

Figure 2:
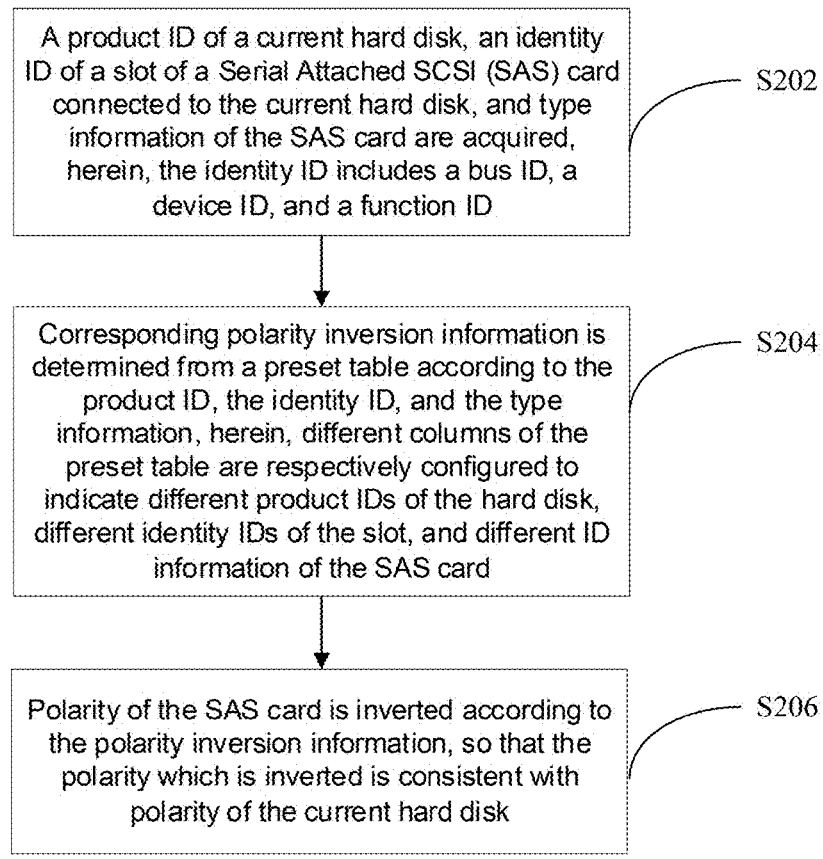
FIG. 2 is a flowchart of an optional polarity inversion method according to an embodiment of the present disclosure.

In this embodiment, a polarity inversion method running on the above computer terminal is provided. FIG. 2 is a flowchart of an optional polarity inversion method according to an embodiment of the present disclosure. As shown in FIG. 2, the process includes the following steps.

At S202, a product ID of a current hard disk, an identity ID of a slot of an SAS card connected to the current hard disk, and type information of the SAS card are acquired. The identity ID includes a bus ID, a device ID, and a function ID.

At S204, corresponding polarity inversion information is determined from a preset table according to the product ID, the identity ID, and the type information. Different columns of the preset table are respectively configured to indicate different product IDs of the hard disk, different identity IDs of the slot, and different ID information of the SAS card.

At S206, the polarity of the SAS card is inverted according to the polarity inversion information, so that the polarity which is inverted is consistent with the polarity of the current hard disk.

Through the present disclosure, the corresponding polarity inversion information can be determined from the preset table according to the product ID, the identity ID, and the type information, and then the polarity of the SAS card is inverted according to the polarity inversion information, so that the polarity which is inverted is consistent with the polarity of the current hard disk. Therefore, the problems such as being unable to communicate with the hard disk when the phy polarity of the SAS card is inconsistent with the phy polarity of the hard disk in the related art may be solved, and the effect of ensuring that the phy polarity of the SAS card is consistent with the phy polarity of the hard disk is achieved.

The process of acquiring a plurality of pieces of parameter information (i.e., the product ID, the identity ID, and the type information) in S202 may be implemented in the following manner.

It is to be noted that the steps of acquiring the above parameter information are not limited in sequence, and in one optional embodiment.

1) The operation of acquiring the product ID of the current hard disk in the following manner may be achieved by the following solution: sending an IPMI command to a target backplane, where the target backplane is provided with the hard disk; and receiving response information of the target backplane, and parsing the product ID from the response information.

In a case where the target backplane is a dual PROM backplane, the IPMI command is sent to a first PROM in two PROMs. In a case where the first PROM fails to successfully acquire the product ID, the IPMI command is forwarded to a second PROM, and the two PROMs include the PROM and the second PROM.

In some embodiments, in a case where neither the first PROM nor the second PROM acquires the product ID, a default product ID is used as the product ID of the current hard disk.

In some embodiments, before sending the IPMI command to the target backplane, the above method further includes: acquiring all IPMI commands provided by a BMC of the target backplane; and determining the IPMI command to be sent to the target backplane from all the IPMI commands.

2) The operation of acquiring the identity ID of the slot of the SAS card connected to the current hard disk may be achieved by the following solution: polling all SAS cards connected to the current hard disk to acquire the device IDs of all the SAS cards; and in a case where a target device ID in the device IDs of all the SAS cards hits the preset table, acquiring a target bus ID and a target function ID corresponding to the target device ID. The identity ID of the slot includes the target device ID, the target bus ID, and the target function ID.

Optionally, the identity IDs of all the SAS cards may be acquired in the process of polling all the SAS cards, and then the target bus ID and the target function ID may be acquired from the identity IDs of all the SAS cards.

3) The operation of acquiring the type information of the SAS card connected to the current hard disk may be achieved by the following solution: acquiring the product ID of the current hard disk; and acquiring the type information of the SAS card corresponding to the product ID of the current hard disk according to a correspondence between the product ID and the type information of the SAS card.

There are various implementations for the implementation of S204. In one optional embodiment, a target row that matches the product ID, the identity ID, and the type information is searched from the preset table; and the polarity inversion information corresponding to the product ID, the identity ID, and the type information is determined from the content corresponding to the target row. The polarity inversion information includes an SAS card that needs to perform polarity inversion, and an inversion manner that performs inversion.

It is to be noted that the above preset table is consistent with Table 3 of the following document. For example, in a case where the product ID is P1, the SAS type is an onboard SAS card, the model is 8072, and the identity ID is 88:00.0, it is determined that polarity inversion is needed, and 8 to 15 RX PNs are inverted.

In some embodiments, in the process of determining whether the polarity of the SAS card needs to be inverted according to the polarity inversion information, so that the SAS card with the polarity which is inverted communicates with the current hard disk, the polarity inversion may be achieved in the following manner: assigning a target value to a field page_code of a target chip, so as to invert the polarity of the SAS card that needs to perform polarity inversion. Specifically, an inversion command may be generated according to the field page_code after the target value is assigned, and then the polarity of the SAS card that needs to perform polarity inversion is inverted according to the inversion command.

In some embodiments, after inverting the polarity of the SAS card according to the polarity inversion information, so that the polarity which is inverted is consistent with the polarity of the current hard disk, the method further includes: initiating a link invalidation process through an uplink port of the SAS card with the polarity which is inverted; and initiating, after a preset time period, a link enabling process through the uplink port of the SAS card with the polarity which is inverted, so as to trigger the recovery capability of a link.

Further, after initiating, after the preset time period, the link enabling process through the uplink port of the SAS card with the polarity which is inverted, so as to trigger the recovery capability of the link, a link status of the link is read; a link speed and a link bandwidth of the link from the link status are parsed; it is determined whether the link speed meets a first preset range and whether the link bandwidth meets a second preset range; and in a case where the link speed does not meet the first preset range and the link bandwidth does not meet the second preset range, it is determined that the link of the SAS card with the polarity which is inverted has an abnormal configuration.

The embodiments of the present disclosure further provide a secondary confirmation process, after determining that the link of the SAS card with the polarity which is inverted has the abnormal configuration, the above method further includes: setting the polarity corresponding to the link having the abnormal configuration as the non-polarity which is inverted; and in a case where the link recovery capability of the link is triggered again and the link is determined to have the abnormal configuration again, stopping inverting the polarity corresponding to the link having the abnormal configuration.

In summary, the embodiments of the present disclosure provide a universal driver adaptation method for the SAS card, so that the same driver may be used to automatically adapt to SAS cards with different phy polarities. The problem that a production line test system needs to maintain a plurality of SAS driver versions is solved, the adaptation and testing time of developers is saved, the production test process is simplified, the product development cycle is shortened, and the product competitiveness is improved.

In order to better understand the above polarity inversion implementation solution, the embodiments of the present disclosure provide an optional embodiment to explain the technical solution of the above embodiment, but are not used to limit the above embodiment.

Figure 3:
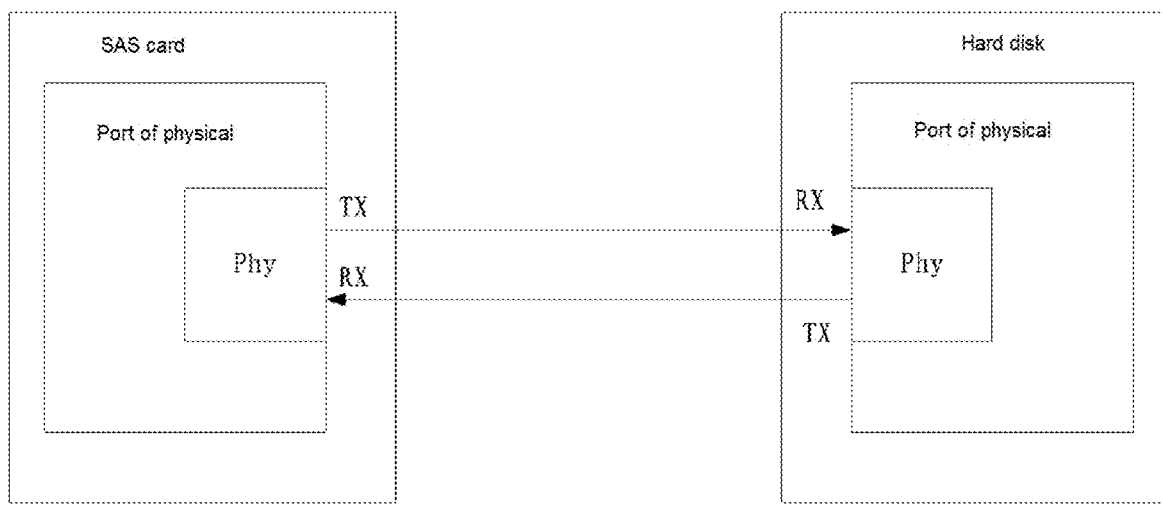
FIG. 3 is a schematic diagram of an optional interaction between an SAS card and a hard disk according to an embodiment of the present disclosure.

As shown in FIG. 3, it may be seen from a schematic diagram of an interaction between an SAS card and a hard disk that a phy on a physical layer of each of upper ports of the SAS card and the hard disk may be understood as a receiver, and each phy has a physical TX polarity and an Rx polarity. Each phy corresponds to an SAS address and a unique ID. When the phy polarity of the SAS card is inconsistent with the phy polarity of a connected extension or hard disk, communication with the hard disk cannot be performed. In the embodiment of the present disclosure, after determining whether there is a polarity that needs to be inverted in the SAS card, logical TX and RX directions of the ports of different physical layers are changed by a method of modifying a profile page through a target chip (such as a pm80xx chip), so that the polarity of the port of the physical layer of the SAS may be consistent with the phy polarity of a connected device.

Based on the schematic diagram of interaction in FIG. 3, the embodiments of the present disclosure provide the following technical solution, which specifically includes the following steps.

At S1, a product ID table is established. It is understandable that the product ID table may be understood as the first column in the following Table 1. Since each product may load different types of SAS cards, the number and polarity of the phy ports of each SAS card are inconsistent. The SAS model (equivalent to the ID information of the SAS in the above embodiment), SAS type, and phy polarity inversion in the following Table 1 are exemplary descriptions and are not used to limit the product ID table.

TABLE 1

| Product ID | SAS type | SAS model | Phy polarity inversion | Phy inversion description |
|---|---|---|---|---|
| P1 | Onboard SAS | 8072 | Yes | Inversion of 8 to 15 RX PNs |
|  | Self-developed SAS card | 8072 | No |  |
|  | Purchased SAS card | 8073 | No |  |
| P2 | Onboard SAS | 8072 | Yes | Inversion of 8 to 15 RX PNs |
|  | Self-developed SAS card | 8072 | No |  |
|  | Purchased SAS card | 8073 | No |  |
| P3 | Onboard SAS | 8072 | Yes | Inversion of 8 to 15 RX PNs |
|  | Self-developed SAS card | 8072 | No |  |
|  | Purchased SAS card | 8073 | No |  |
| P4 | Onboard SAS | 8070 | Yes | Inversion of 4 to 7 RX PNs |
|  | Self-developed SAS card | 8072 | No |  |
|  | Purchased SAS card | 8073 | No |  |
| P5 | Self-developed SAS card | 8072 | No |  |
|  | Purchased SAS card | 8073 | No |  |
| P6 | Self-developed SAS card | 8072 | No |  |
|  | Purchased SAS card | 8073 | No |  |
| P7 | Self-developed SAS card | 8072 | No |  |
|  | Purchased SAS card | 8073 | No |  |
| P8 | Onboard SAS | 8054 | No |  |

At S2, a slot ID table (slot ID table, equivalent to the identity ID of the slot corresponding to the hard disk in the above embodiment) of the external expansion slot of the hard disk is established. Since the external expansion slot of each hard disk product is fixed, each slot has a fixed PCIE BDF (bus ID, device ID, function ID), which is equivalent to the bus ID, the device ID, and the function ID in the above embodiment.

At S3, an SAS ID table (SAS ID table, equivalent to the type information of the SAS card in the above embodiment) is established. Since the chip model of the SAS card configured for each hard disk product is known, such as 8072, 8070, 8073, 8054, etc., the SAS ID table may be the SAS model in the above Table 1.

It is to be noted that the above S1 to S3 may be implemented in an order that is completely adjustable if necessary, for example, S2 may be performed first, then S1, and then S3. There are no limits made thereto in the embodiments of the present disclosure.

At S4, a PCIE device connected to the hard disk starts a scanning process, polls the PCIE devices in a PCIE topology, and reads a device ID of each PCIE device; and when the read device ID is in the slot ID table established in the above S2, a probe of a universal SAS driver is called to perform the subsequent process. It is to be noted that the read device ID may be not in the slot ID table established in S2, that is, it may be understood that the product ID is not in the slot ID table established in S2. The following Table 2 shows that the product ID is not in the slot ID table.

TABLE 2

| Product id | SAS type | SAS id | Slot id |
|---|---|---|---|
| P1 | Onboard SAS | 8072 | 88:00.0 |
|  | Self-developed SAS card | 8072 | 87:00.0 |
|  | Purchased SAS card | 8073 | 87:00.0 |
| P2 | Onboard SAS | 8072 | B0:D0.F0 |
|  | Self-developed SAS card | 8072 | B1:D0.F0 |
|  | Purchased SAS card | 8073 | B1:D0.F0 |
| P3 | Onboard SAS | 8072 | B0:D0.F0 |
|  | Self-developed SAS card | 8072 | B1:D0.F0 |
|  | Purchased SAS card | 8073 | B1:D0.F0 |
| P4 | Onboard SAS | 8070 | B0:D0.F0 |
|  | Self-developed SAS card | 8072 | B1:D0.F0 |
|  | Purchased SAS card | 8073 | B1:D0.F0 |
| P5 | Self-developed SAS card | 8072 | B1:D0.F0 |
|  | Purchased SAS card | 8073 | B1:D0.F0 |
| P6 | Self-developed SAS card | 8072 | B1:D0.F0 |
|  | Purchased SAS card | 8073 | B1:D0.F0 |
| P7 | Self-developed SAS card | 8072 | B1:D0.F0 |
|  | Purchased SAS card | 8073 | B1:D0.F0 |
| P8 | Onboard SAS | 8054 | B1:D0.F0 |

At S5, the device ID of the PCIE device acquired in S4 is enabled, that is, the current PCIE corresponding to the device ID is set as master, and the BDF number of the current PCIE device is recorded.

At S6, pci slot bus master is set through a PCIE command register. Specifically, pci slot bus master may be set by setting bit2: Bus master enable of a COMMND (offset-0x04) register in Type Header of the current PCIE device to 1.

At S7, Product ID information of a backplane VPD is read through a BMC interface.

Specifically, the product ID information of the backplane VPD may be read through an IPMI command provided by a BMC.

The backplane VPD of the embodiment of the present disclosure has two Electrically Erasable PROM (EEPROM) backups. When one of the EEPROMs fails to read, the product ID information stored in the backup EEPROM is read.

When both EEPROM backups fail to read, a log is recorded and a default product ID is used.

At S8, after S1 to S3, Table 3 (equivalent to the preset table in the above embodiment) can be established. Then, by traversing the detailed content of Table 3, a comprehensive determination is made through the BDF, slot ID table, and product ID table of the current SAS device to determine whether the current SAS device is an onboard SAS, whether polarity inversion is needed, and which phys need polarity inversion.

Specifically, the acquired BDF and product ID of the PCIE device may be matched in Table 3 to identify whether the phy polarity needs to be inverted, and if so, to identify which ports need to perform polarity inversion.

TABLE 3

| Product id | SAS type | Chip model | Slot id | Phy polarity inversion | Phy inversion description |
|---|---|---|---|---|---|
| P1 | Onboard SAS | 8072 | 88:00.0 | Yes | Inversion of 8 to 15 RX PNs |
|  | Self-developed SAS card | 8072 | 87:00.0 | No |  |
|  | Purchased SAS card | 8073 | 87:00.0 | No |  |
| P2 | Onboard SAS | 8072 | B0:D0.F0 | Yes | Inversion of 8 to 15 RX PNs |
|  | Self-developed SAS card | 8072 | B1:D0.F0 | No |  |
|  | Purchased SAS card | 8073 | B1:D0.F0 | No |  |
| P3 | Onboard SAS | 8072 | B0:D0.F0 | Yes | Inversion of 8 to 15 RX PNs |
|  | Self-developed SAS card | 8072 | B1:D0.F0 | No |  |
|  | Purchased SAS card | 8073 | B1:D0.F0 | No |  |
| P4 | Onboard SAS | 8070 | B0:D0.F0 | Yes | Inversion of 4 to 7 RX PNs |
|  | Self-developed SAS card | 8072 | B1:D0.F0 | No |  |
|  | Purchased SAS card | 8073 | B1:D0.F0 | No |  |
| P5 | Self-developed SAS card | 8072 | B1:D0.F0 | No |  |
|  | Purchased SAS card | 8073 | B1:D0.F0 | No |  |
| P6 | Self-developed SAS card | 8072 | B1:D0.F0 | No |  |
|  | Purchased SAS card | 8073 | B1:D0.F0 | No |  |
| P7 | Self-developed SAS card | 8072 | B1:D0.F0 | No |  |
|  | Purchased SAS card | 8073 | B1:D0.F0 | No |  |
| P8 | Onboard SAS | 8054 | B1:D0.F0 | No |  |

At S9, different polarity inversion configurations are loaded respectively through the determination in S8.

It is to be noted that, according to the polarity inversion situation obtained in S8, the logical TX and RX directions of different phy ports are changed through the method of modifying the profile page provided by the pm80xx chip, so that the phy polarity of the SAS may be consistent with the phy polarity of the connected device.

Through page_code-9, tx and rx attributes of all phys that need to be inverted of the current SAS device are inverted in sequence.

At S10, after a polarity inversion configuration is completed, a link shutdown process is initiated on an uplink port of the SAS card. After waiting for 100 ms, a link enabling process is initiated to trigger a retraining process of a PCIE link.

At S11, a status of the PCIE link between the SAS card and the uplink port is read, that is, it is determined whether a link speed and a link bandwidth are normal; and if not, the configuration of the link of the SAS card with the current polarity is abnormal, and a log is recorded.

According to S12, the SAS phy with the abnormal link is reconfigured to RX non-inversion; then S10 to S11 are initiated; and if the link is still abnormal, the current SAS link is determined to be abnormal, the log is recorded, and the subsequent driver configuration is no longer loaded.

At S13, a subsequent general SAS driver configuration is loaded.

Through the above description of implementations, those skilled in the art may clearly know that the method according to the above embodiments may be implemented by means of software plus a necessary common hardware platform, certainly by means of hardware; but in many cases, the former is the better implementation. Based on such understanding, the technical solution of the present disclosure, which is essential or contributes to the conventional art, may be embodied in the form of a software product. The computer software product is stored in a storage medium (such as a Read-Only Memory (ROM)/RAM, a magnetic disk and an optical disc), including a number of commands for causing a terminal device (which may be a mobile phone, a computer, a server, or a network device, etc.) to perform the methods described in various embodiments of the present disclosure.

The embodiments further provide a polarity inversion apparatus, which is configured to implement the above embodiments. The embodiments and preferred implementations that have been elaborated will not be repeated here. The term "component" used below can realize a combination of software and/or hardware with an intended function. Although the apparatus described in the following embodiment can be realized by software, but by hardware or a combination of software and hardware is also possible and conceived.

Figure 4:
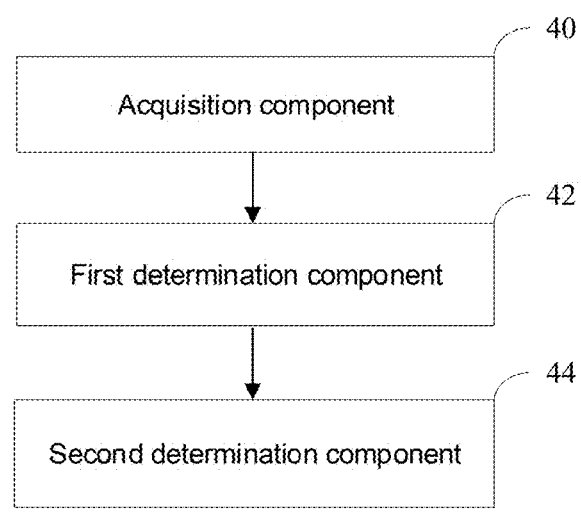
FIG. 4 is a structural block diagram of a polarity inversion apparatus according to an embodiment of the present disclosure.

FIG. 4 is a structural block diagram of a polarity inversion apparatus according to an embodiment of the present disclosure. As shown in FIG. 4, the apparatus includes: an acquisition component 40, a first determination component 42, and a second determination component 44.

The acquisition component 40 is configured to acquire a product ID of a current hard disk, an identity ID of a slot corresponding to the current hard disk, and type information of the SAS card connected to the current hard disk. The identity ID includes a bus ID, a device ID, and a function ID.

The first determination component 42 is configured to acquire corresponding polarity inversion information from a preset table according to the product ID, the identity ID, and the type information. Different columns of the preset table are respectively configured to indicate different product IDs of the hard disk, different identity IDs of the slot corresponding to the hard disk, and different ID information of the SAS card.

The second determination component 44 is configured to determine whether the polarity of the SAS card needs to be inverted according to the polarity inversion information, so that the polarity which is inverted is consistent with the polarity of the current hard disk.

Through the present disclosure, the corresponding polarity inversion information can be determined from the preset table according to the product ID, the identity ID, and the type information, and then the polarity of the SAS card is inverted according to the polarity inversion information, so that the polarity which is inverted is consistent with the polarity of the current hard disk. Therefore, the problems such as being unable to communicate with the hard disk when the phy polarity of the SAS card is inconsistent with the phy polarity of the hard disk in the related art may be solved, and the effect of ensuring that the phy polarity of the SAS card is consistent with the phy polarity of the hard disk is achieved.

In some embodiments, the acquisition component 40 is further configured to send an IPMI command to a target backplane, where the target backplane is provided with the hard disk; and receive response information of the target backplane, and parse the product ID from the response information.

In some embodiments, the acquisition component 40 is further configured to send, in a case where the target backplane is a dual PROM backplane, the IPMI command to a first PROM in two PROMs. In a case where the first PROM fails to successfully acquire the product ID, the IPMI command is forwarded to a second PROM, and the two PROMs include the PROM and the second PROM.

In some embodiments, in a case where neither the first PROM nor the second PROM acquires the product ID, the acquisition component 40 is further configured to use a default product ID as the product ID of the current hard disk.

In some embodiments, the acquisition component 40 is further configured to acquire all IPMI commands provided by a BMC of the target backplane; and determine the IPMI command to be sent to the target backplane from all the IPMI commands.

In some embodiments, the acquisition component 40 is further configured to poll all SAS cards connected to the current hard disk to acquire the device IDs of all the SAS cards; and acquire, in a case where a target device ID in the device IDs of all the SAS cards hits the preset table, a target bus ID and a target function ID corresponding to the target device ID. The identity ID of the slot includes the target device ID, the target bus ID, and the target function ID.

In some embodiments, the acquisition component 40 is further configured to acquire the product ID of the current hard disk; and acquire the type information of the SAS card corresponding to the product ID of the current hard disk according to a correspondence between the product ID and the type information of the SAS card.

In some embodiments, the first determination component 42 is further configured to search a target row that matches the product ID, the identity ID, and the type information from the preset table; and determine the polarity inversion information corresponding to the product ID, the identity ID, and the type information from the content corresponding to the target row. The polarity inversion information includes an SAS card that needs to perform polarity inversion, and an inversion manner that performs inversion.

In some embodiments, the second determination component 44 is further configured to assign a target value to a field page_code of a target chip, and generate an inversion command according to the field page_code after the target value is assigned; and invert the polarity of the SAS card that needs to perform polarity inversion according to the inversion command.

Figure 5:
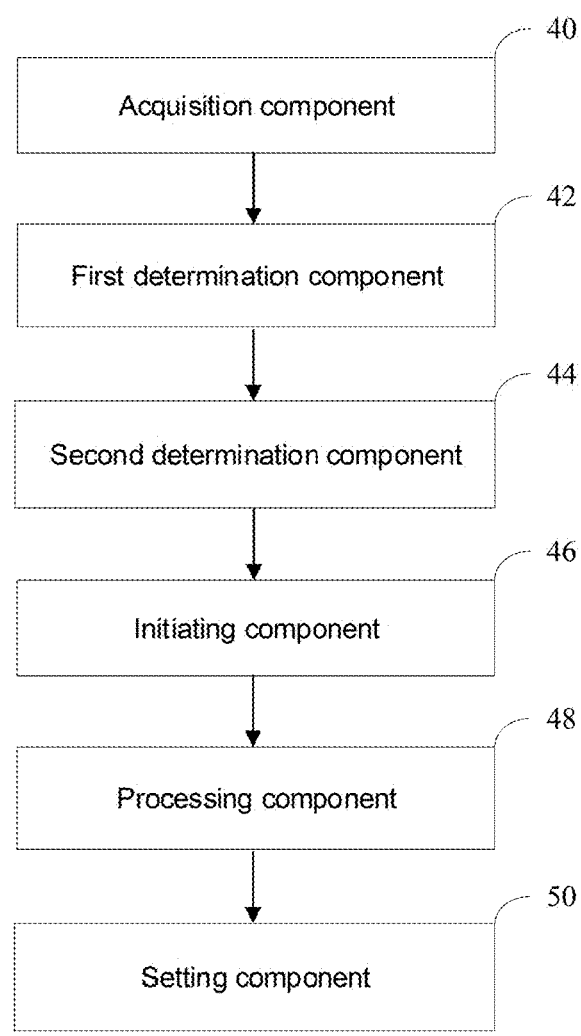
FIG. 5 is another structural block diagram of a polarity inversion apparatus according to an embodiment of the present disclosure.

As shown in FIG. 5, In some embodiments, the apparatus further includes an initiating component 46, further configured to initiate, after inverting the polarity of the SAS card according to the polarity inversion information, so that the polarity which is inverted is consistent with the polarity of the current hard disk, a link invalidation process through an uplink port of the SAS card with the polarity which is inverted; and initiate, after a preset time period, a link enabling process through the uplink port of the SAS card with the polarity which is inverted, so as to trigger the recovery capability of a link.

In some embodiments, the apparatus further includes a processing component 48, configured to read a link status of the link; parse a link speed and a link bandwidth of the link from the link status; determine whether the link speed meets a first preset range and whether the link bandwidth meets a second preset range; and determine, in a case where the link speed does not meet the first preset range and the link bandwidth does not meet the second preset range, that the link of the SAS card with the polarity which is inverted has an abnormal configuration.

In some embodiments, the apparatus further includes a setting component 50, further configured to set the polarity corresponding to the link having the abnormal configuration as the non-polarity which is inverted; and stop, in a case where the link recovery capability of the link is triggered again and the link is determined to have the abnormal configuration again, inverting the polarity corresponding to the link having the abnormal configuration.

It is to be noted that, each of the above components may be realized by software or hardware. For the latter, the each of the above components may be realized by, but is not limited to, the following way: all of the above components are in the same processor; or, the above components are respectively in different processors in form of any combination.

The embodiments of the present disclosure further provide a non-transitory computer-readable storage medium, in which a computer program is stored. The computer program is configured to execute the steps in any of the above method embodiments when running.

At S1, a product ID of a current hard disk, an identity ID of a slot of an SAS card connected to the current hard disk, and type information of the SAS card are acquired. The identity ID includes a bus ID, a device ID, and a function ID.

At S2, corresponding polarity inversion information is determined from a preset table according to the product ID, the identity ID, and the type information. Different columns of the preset table are respectively configured to indicate different product IDs of the hard disk, different identity IDs of the slot, and different ID information of the SAS card.

At S3, the polarity of the SAS card is inverted according to the polarity inversion information, so that the polarity which is inverted is consistent with the polarity of the current hard disk.

In some embodiments, the computer-readable storage medium may include, but is not limited to, a U disk, an ROM, an RAM, a mobile hard disk, a magnetic disk, a compact disc, and other media capable of storing the computer program.

The embodiments of the present disclosure further provide an electronic apparatus, which includes a memory and a processor. A computer program is stored in the memory. The processor is configured to run the computer program to execute the steps in any of the above method embodiments.

At S1, a product ID of a current hard disk, an identity ID of a slot of an SAS card connected to the current hard disk, and type information of the SAS card are acquired. The identity ID includes a bus ID, a device ID, and a function ID.

At S2, corresponding polarity inversion information is determined from a preset table according to the product ID, the identity ID, and the type information. Different columns of the preset table are respectively configured to indicate different product IDs of the hard disk, different identity IDs of the slot, and different ID information of the SAS card.

At S3, the polarity of the SAS card is inverted according to the polarity inversion information, so that the polarity which is inverted is consistent with the polarity of the current hard disk.

In some embodiments, the electronic device may further include a transmission device and an input/output device. The transmission device is connected with the processor, and the input/output device is connected with the processor.

The specific examples in this embodiment may refer to the above embodiments and the examples described in the optional implementations, which will not be elaborated herein.

It is apparent that those skilled in the art should appreciate that the above components and steps of the present disclosure may be implemented by a general-purpose computing apparatus, and they may be centralized in a single computing apparatus or distributed on a network composed of a plurality of computing apparatuses; they may be implemented by a program code which is capable of being executed by the computing apparatus, so that they may be stored in a storage apparatus and executed by the computing apparatus; and in some situations, the presented or described steps may be executed in an order different from that described here; or they are made into integrated circuit components, respectively; or multiple components and steps of them are made into a single integrated circuit component to realize. Thus, the present disclosure is not limited to any particular combination of hardware and software.

The above are only the embodiments of the present disclosure, and is not intended to limit the present disclosure, and for those of ordinary skill in the art, various modifications and changes can be made to the present disclosure. Any modifications, equivalent substitutions, improvements, etc. within the scope of the present disclosure shall be included in the principle of the present disclosure.

What is claimed is:

1. A polarity inversion method, comprising:
   acquiring a product ID of a current hard disk, an identity ID of a slot of a Serial Attached SCSI (SAS) card connected to the current hard disk, and type information of the SAS card, wherein the identity ID comprises a bus ID, a device ID, and a function ID;
   determining corresponding polarity inversion information from a preset table according to the product ID, the identity ID, and the type information, wherein different columns of the preset table are respectively configured to indicate different product IDs of the hard disk, different identity IDs of the slot, and different ID information of the SAS card; and
   inverting polarity of the SAS card according to the polarity inversion information, so that the polarity which is inverted is consistent with polarity of the current hard disk.

2. The method according to claim 1, wherein acquiring the product ID of the current hard disk comprises:
   sending an Intelligent Platform Management Interface (IPMI) command to a target backplane, wherein the target backplane is provided with the hard disk; and
   receiving response information of the target backplane, and parsing the product ID from the response information.

3. The method according to claim 2, wherein sending the IPMI command to the target backplane comprises:
   in a case where the target backplane is a dual Programmable Read Only Memory (PROM) backplane, sending the IPMI command to a first PROM in two PROMs, wherein, in a case where the first PROM fails to successfully acquire the product ID, the IPMI command is forwarded to a second PROM, and the two PROMs comprise the first PROM and the second PROM.

4. The method according to claim 3, further comprising:
   in a case where neither the first PROM nor the second PROM acquires the product ID, using a default product ID as the product ID of the current hard disk.

5. The method according to claim 2, wherein before sending the IPMI command to the target backplane, the method further comprises:
   acquiring all IPMI commands provided by a Baseband Management Controller (BMC) of the target backplane; and determining the IPMI command to be sent to the target backplane from all the IPMI commands.

6. The method according to claim 1, wherein acquiring the identity ID of the slot of the SAS card connected to the current hard disk comprises:
  polling all SAS cards connected to the current hard disk to acquire the device IDs of all the SAS cards; and
  in a case where a target device ID in the device IDs of all the SAS cards hits the preset table, acquiring a target bus ID and a target function ID corresponding to the target device ID, wherein the identity ID of the slot comprises the target device ID, the target bus ID, and the target function ID.

7. The method according to claim 6, wherein after the target device ID in the device IDs of all the SAS cards hits the preset table, the method further comprises:
  setting the SAS card corresponding to the target device ID as a master device.

8. The method according to claim 1, wherein acquiring the type information of the SAS card connected to the current hard disk comprises:
  acquiring the product ID of the current hard disk; and
  acquiring the type information of the SAS card corresponding to the product ID of the current hard disk according to a correspondence between the product ID and the type information of the SAS card.

9. The method according to claim 8, wherein acquiring the product ID of the current hard disk comprises:
  acquiring the product ID of the current hard disk through a BMC interface.

10. The method according to claim 1, wherein determining the corresponding polarity inversion information from the preset table according to the product ID, the identity ID, and the type information comprises:
  searching a target row that matches the product ID, the identity ID, and the type information from the preset table; and
  determining the polarity inversion information corresponding to the product ID, the identity ID, and the type information from content corresponding to the target row, wherein the polarity inversion information comprises an SAS card that needs to perform polarity inversion, and an inversion manner that performs inversion.

11. The method according to claim 10, wherein in the process of determining the polarity inversion information corresponding to the product ID, the identity ID, and the type information from the content corresponding to the target row, the method further comprises:
  determining whether the SAS card is an onboard SAS card from the preset table.

12. The method according to claim 1, wherein the inverting the polarity of the SAS card according to the polarity inversion information, so that the polarity which is inverted is consistent with the polarity of the current hard disk comprises:
  assigning a target value to a field page_code of a target chip, and generating an inversion command according to the field page_code after the target value is assigned; and
  inverting the polarity of the SAS card that needs to perform polarity inversion according to the inversion command, so that the polarity which is inverted is consistent with the polarity of the current hard disk.

13. The method according to claim 12, wherein assigning the target value to the field page_code of the target chip comprises:

assigning the target value to the field page_code provided by a pm80xx chip.

14. The method according to claim 1, wherein after inverting the polarity of the SAS card according to the polarity inversion information, so that the polarity which is inverted is consistent with the polarity of the current hard disk, the method further comprises:
  initiating a link invalidation process through an uplink port of the SAS card with the polarity which is inverted; and
  initiating, after a preset time period, a link enabling process through the uplink port of the SAS card with the polarity which is inverted, so as to trigger recovery capability of a link.

15. The method according to claim 14, wherein after initiating, after the preset time period, the link enabling process through the uplink port of the SAS card with the polarity which is inverted, so as to trigger the recovery capability of the link, the method further comprises:
  reading a link status of the link;
  parsing a link speed and a link bandwidth of the link from the link status;
  determining whether the link speed meets a first preset range and whether the link bandwidth meets a second preset range; and
  in a case where the link speed does not meet the first preset range and the link bandwidth does not meet the second preset range, determining that the link of the SAS card with the polarity which is inverted has an abnormal configuration.

16. The method according to claim 15, wherein after determining that the link of the SAS card with the polarity which is inverted has the abnormal configuration, the method further comprises:
  setting the polarity corresponding to the link having the abnormal configuration as a non-inverted polarity; and
  in a case where the link recovery capability of the link is triggered again and the link is determined to have the abnormal configuration again, stopping inverting the polarity corresponding to the link having the abnormal configuration.

17. A non-transitory computer-readable storage medium, in which a computer program is stored, wherein the computer program is executed by a processor, cause the processor to:
  acquire a product ID of a current hard disk, an identity ID of a slot of a Serial Attached SCSI (SAS) card connected to the current hard disk, and type information of the SAS card, wherein the identity ID comprises a bus ID, a device ID, and a function ID;
  determine corresponding polarity inversion information from a preset table according to the product ID, the identity ID, and the type information, wherein different columns of the preset table are respectively configured to indicate different product IDs of the hard disk, different identity IDs of the slot, and different ID information of the SAS card; and
  invert polarity of the SAS card according to the polarity inversion information, so that the polarity which is inverted is consistent with polarity of the current hard disk.

18. An electronic apparatus, comprising a memory, a processor, and a computer program stored in the memory and runnable on the processor, wherein the processor, when executing the computer program-, is enabled to:
  acquire a product ID of a current hard disk, an identity ID of a slot of a Serial Attached SCSI (SAS) card connected to the current hard disk, and type information of the SAS card, wherein the identity ID comprises a bus ID, a device ID, and a function ID;

determine corresponding polarity inversion information from a preset table according to the product ID, the identity ID, and the type information, wherein different columns of the preset table are respectively configured to indicate different product IDs of the hard disk, different identity IDs of the slot, and different ID information of the SAS card; and invert polarity of the SAS card according to the polarity inversion information, so that the polarity which is inverted is consistent with polarity of the current hard disk.

19. The method according to claim 1, further comprising:

In a case that a Peripheral Component Interconnect Express (PCIE) device connected to the hard disk starts a scanning process, polling the PCIE devices in a PCIE topology, and reading a device ID of each PCIE device;

In a case that the read device ID is in a slot ID table, a probe of a universal SAS driver is called, wherein, the slot ID table is configured to indicate the different identity IDs of the slot.

20. The method according to claim 19, further comprising:

enabling the device ID of the each PCIE Device;

setting pci slot bus master through a PCIE command register;

reading product ID information of a backplane is read through a BMC interface.

* * * * *